United States Patent Office 2,722,511
Patented Nov. 1, 1955

2,722,511

METHOD OF REMOVING CONDUCTIVE COATING

Keith H. Butler, Marblehead, and Richard M. Rulon, Wenham, Mass., assignors to Sylvania Electric Products Inc., Salem, Mass., a corporation of Massachusetts No Drawing. Application November 28, 1952, Serial No. 323,166

9 Claims. (Cl. 204—130)

This invention relates to the removal from electrically conductive ceramics of the coating responsible for the conductivity, said coating having been formed by treatment of the ceramic while hot with solutions or vapors of certain metallic compounds according to procedures well known in the art.

While various methods can be used for creating this conductive coating, and various ceramics can be made conductive by these methods, the best known is probably that of making glass electrically conductive by spraying while hot with a solution consisting substantially of a metallic compound, for example chlorides, or less commonly, oxides, sulphates or organic complexes. Alternatively the process of applying the conductive coating to a glass plate can be carried out, for example, by heating the glass plate and exposing it while hot to vapors of the chlorides of metals such as tin, antimony or indium, and afterward placing the treated glass plate in a slightly reducing atmosphere. When the application in the vapor state or by spraying is not convenient, good results can be obtained by mixing stannic chloride with absolute alcohol and glacial acetic acid and dipping the heated glass into the boiling mixture.

The method of removing this conductive coating is not limited in any way by the method by which the coating is formed, but can be used to remove the general type of conductive coating from glass or any ceramic body. Such ceramics having conductive coatings are used in a wide variety of applications, and in many of these applications it is desirable to remove the conductive coating from a portion of the surface thereby insulating it from the remainder of the surface.

One specific example of the use of conductive glass, where an insulated area is required, is the electroluminescent lamp. Electroluminescent lamps usually comprise a base of light-transmitting material, such as a glass plate for example, a transparent conductive coating over a face thereof, and a layer of a field-responsive phosphor in a light-transmitting, insulating, dielectric material disposed between the aforementioned transparent conductive coating and an electrically-conductive layer, such as shown in U. S. Patent No. 2,566,349 issued September 4, 1951 to E. L. Mager, for example.

Light is emitted from the device when an alternating voltage is applied between the conductive layer and the conductive coating, between which the layer of a field-responsive phosphor is disposed. The application of such a voltage generally requires that electrical contact be made between the conductive coating and one terminal of a power source and between the conductive layer and the other terminal of the power source. Since care must be exercised to make sure that the conductive coating and the conductive layer are insulated from one another, this insulated condition may be attained by confining the transparent conductive coating on the glass plate to only a portion of a face thereof and extending the conductive layer beyond the limits of the phosphor-dielectric layer and onto that portion of the glass plate to which the transparent conductive coating itself does not extend. A pair of spaced metal contact strips may then be affixed to the edge of the glass plate, one being in contact with the transparent, conductive coating, and the other in contact with the conductive layer on top of the phosphor-dielectric layer, as taught in the co-pending application of Butler et al., Ser. No. 230,596 filed June 8, 1951, for example.

A clear area on the glass plate, free from the transparent conductive coating, may be obtained in either of two ways, viz., by masking the area before the application of the transparent conductive coating or by removing a portion of the coating after the entire area of a face of the glass plate has been coated. We have found it more suitable to employ the latter rather than the former method, especially when plates with a wide variety of dimensions are to be made.

When an abrasive, such as silicon carbide for example, was employed to effect removal of a portion of the conductive coating, it was noted that the abrasive removed not only the conductive coating but also a certain amount of the glass plate itself, thereby producing a sensible height differential or "step" between the surface of the decoated glass and that of the conducting surface, and a deleterious change in the optical properties of the decoated area. The use of a polishing abrasive, a time-consuming operation, was necessary to correct the latter condition.

When a portion of the conductive coating is removed chemically, such as by the application thereto of an agitated mixture of a metal such as zinc and an acid such as sulphuric, for example, it was found that this method is quite tedious and time-consuming, although it does avoid formation of a "step" and deleterious changes in the optical properties of the decoated glass plate.

An object of this invention is, therefore, to remove easily and quickly from an electrically conductive ceramic body the coating responsible for the conductivity.

Another object is to remove a portion of the conductive coating on an electrically conductive glass plate without altering the optical properties of the glass.

A further object is to remove a portion of the conductive coating on an electrically conductive glass plate without also removing a certain amount of the glass.

These and other objects, advantages and features are attained, in accordance with the principles of our invention, by an electrolytic method. In this method, the conductive coating on the glass plate is utilized as one electrode of an electrolytic cell, the other electrode being a carbon rod or other suitable member. When a direct current source of electrical energy is used, we have found it necessary to make the conductive coating the negative electrode of the electrolytic cell because, if the conductive coating is used as the positive electrode, no appreciable decoating is effected within a reasonable period of time and under satisfactory working conditions. The electrolyte employed must be one which is capable of causing evolution of hydrogen at the negative electrode of the cell either directly or by the deposition of a metal which subsequently reacts with the electrolyte to liberate hydrogen. When metals low in the electromotive series are employed in the composition of the electrolyte, the tendency toward hydrogen liberation is reduced and thus their use in this process is not recommended. However, we have found that the use of an alternating current source of electrical energy enables satisfactory decoating to be obtained with less active metals than can be satisfactorily employed with a direct current source.

The following are some of the electrolytes which have been found to work satisfactorily:

$Na_2CO_3$ 5 g./100 ml. water
$NaHCO_3$ 5 g./100 ml. water
$CaCl_2$ 5 g./100 ml. water
KCl 5 g./100 ml. water
$MgCl_2$ 5 g./100 ml. water
LiCl 5 g./100 ml. water
$Ca(OH)_2$ sat. solution
$ZnCl_2$ sat. solution
$SnCl_2$ sat. solution
Conc. acetic acid 5 ml./100 ml. water
Conc. nitric acid 5 ml./100 ml. water
Conc. sulfuric acid 5 ml./100 ml. water
Conc. hydrochloric acid 5 ml./100 ml. water In the performance of this electrolytic de-coating process, we have found that the gradual immersion of the glass plate, with the conductive coating on a face thereof, into the solution will effect a complete de-coat from the point of first contact to the depth of immersion. Application of the solution by means of a wick, roller or other suitable mechanical feed apparatus will also effect decoating of the desired area, provided, of course that electrical contact with the applicator is maintained at all times. When this method of application is used, the negative terminal of the battery is connected by a metallic contact to the conductive coating on the glass plate and the positive terminal is connected to the wick or roller.

Alternatively, a blotter may be employed as the solution applicator, the blotter serving as a solution reservoir. When a wet blotter is used, an edge of the coated glass plate is placed in firm contact therewith and the solution advances onto the surface of the coated glass plate by capillary action, removing the conductive coating as it progresses. With this method, a slightly alkaline solution is preferred, because of its better wetting power.

Although no great care need be exercised in cleaning the glass plate prior to de-coating, cleaning is recommended in order to avoid slight irregularities in the boundary between the coated and de-coated areas which occur due to creeping of the solution at a non-uniform rate, particularly when alkaline solutions are employed. A more regular boundary may also be obtained by modification of the solution by the addition of thickening agents such as glycerine, gelatin or glue, for example.

We have found that, in the practice of the method of our invention, de-coating occurs only near the intersection of the coated glass plate, the solution and the air. Therefore, it is essential that the glass plate, the wick or the roller, depending on the application means employed, be advanced at a pre-determined uniform speed so that complete de-coating always occurs at the intersection defined above, because otherwise conducting areas may remain in the area being de-coated.

The applied voltage, in the practice of the method of our invention, must be somewhat above the reduction potential of the positive ion of the electrolyte used. Although an increase in the voltage above this value will produce a more rapid de-coat, care should be exercised in increasing the voltage so as to avoid excessive heating of the glass plate and bubbling of the solution.

What we claim is:

1. The method of removing an electrically conductive thin coating, essentially non-metallic in its nature, from the surface of a ceramic body, said method comprising: connecting the negative terminal of a direct current source of electrical energy to the electrically conductive thin coating, thereby establishing a negative electrode; connecting the positive terminal of said source of electrical energy to an electrode in an electrolytically-conductive solution capable of causing evolution of hydrogen at said negative electrode; and gradually exposing the electrically conductive thin coating on the ceramic body edgewise to the action of said electrolytically-conductive solution in a manner to gradually decrease the area thereof while maintaining the point of connection of said source of electrical energy thereto within the decreasing area.

2. The method of removing an electrically conductive thin coating, essentially non-metallic in its nature, from the surface of a ceramic body, said method comprising: connecting one terminal of an alternating current source of electrical energy to the electrically conductive thin coating, thereby establishing a first electrode; connecting the other terminal of said source of electrical energy to a second electrode, said second electrode being in an electrolytically-conductive solution capable of causing evolution of hydrogen at said first electrode; and gradually exposing the electrically conductive thin coating on the ceramic body edgewise to the action of said electrolytically-conductive solution in a manner to gradually decrease the area thereof while maintaining the point of connection of said source of electrical energy thereto within the decreasing area.

3. The method of removing an electrically conductive thin coating, essentially non-metallic in its nature, from the surface of a ceramic body, said method comprising: connecting the negative terminal of a direct current source of electrical energy to the electrically conductive thin coating, thereby establishing a negative electrode; connecting the positive terminal of said source of electrical energy to an electrode in an electrolytically-conductive solution capable of causing evolution of hydrogen at said negative electrode; and gradually immersing in said electrolytically-conductive solution the ceramic body bearing the electrically conductive thin coating to be removed in a manner to gradually decrease the area thereof while maintaining the point of connection of said source of electrical energy thereto within the decreasing area.

4. The method of removing an electrically conductive thin coating, essentially non-metallic in its nature, from the surface of a ceramic body, said method comprising: connecting one terminal of an alternating current source of electrical energy to the electrically conductive thin coating, thereby establishing a first electrode; connecting the other terminal of said source of electrical energy to a second electrode, said second electrode being in an electrolytically-conductive solution capable of causing evolution of hydrogen at said first electrode; and gradually immersing in said electrolytically-conductive solution the ceramic body bearing the electrically conductive thin coating to be removed in a manner to gradually decrease the area thereof while maintaining the point of connection of said source of electrical energy thereto within the decreasing area.

5. The method of removing an electrically conductive thin coating, essentially non-metallic in its nature, from the surface of a glass plate, said method comprising: connecting the negative terminal of a direct current source of electrical energy to the electrically conductive thin coating, thereby establishing a negative electrode; connecting the positive terminal of said source of electrical energy to an electrode in an electrolytically-conductive solution capable of causing evolution of hydrogen at said negative electrode; and gradually exposing the electrically conductive thin coating on the glass plate edgewise to the action of said electrolytically-conductive solution in a manner to gradually decrease the area thereof while maintaining the point of connection of said source of electrical energy thereto within the decreasing area.

6. The method of removing an electrically conductive thin coating, essentially non-metallic in its nature, from the surface of a glass plate, said method comprising: connecting one terminal of an alternating current source of electrical energy to the electrically conductive thin coating, thereby establishing a first electrode; connecting the other terminal of said source of electrical energy to a second electrode, said second electrode being in an electrolytically-conductive solution capable of causing evolution of hydrogen at said first electrode; and gradually exposing the electrically conductive thin coating on the glass plate edgewise to the action of said electrolytically-conductive solution in a manner to gradually decrease the area thereof while maintaining the point of connection of said source of electrical energy thereto within the decreasing area.

7. The method of removing an electrically conductive thin coating, essentially non-metallic in its nature, from the surface of a glass plate, said method comprising: connecting the negative terminal of a direct current source of electrical energy to the electrically conductive thin coating, thereby establishing a negative electrode; connecting the positive terminal of said source of electrical energy to an electrode in an electrolytically-conductive solution capable of causing evolution of hydrogen at said negative electrode; and gradually immersing in said electrolytically-conductive solution the glass plate bearing the electrically conductive thin coating to be removed in a manner to gradually decrease the area thereof while maintaining the point of connection of said source of electrical energy thereto within the decreasing area.

8. The method of removing an electrically conductive thin coating, essentially non-metallic in its nature, from the surface of a glass plate, said method comprising: connecting one terminal of an alternating current source of electrical energy to the electrically conductive thin coating, thereby establishing a first electrode; connecting the other terminal of said source of electrical energy to a second electrode, said second electrode being in an electrolytically-conductive solution capable of causing evolution of hydrogen at said first electrode; and gradually immersing in said electrolytically-conductive solution the glass plate bearing the electrically conductive thin coating to be removed in a manner to gradually decrease the area thereof while maintaining the point of connection of said source of electrical energy thereto within the decreasing area.

9. The method of removing an electrically conductive thin coating, essentially non-metallic in its nature, from the surface of a ceramic body, said method comprising: connecting one terminal of a source of electrical energy to the electrically conductive thin coating, thereby establishing a first electrode, said first electrode being negative for at least a portion of the time; connecting the other terminal of said source of electrical energy to a second electrode, said second electrode being in an electrolytically-conductive solution capable of causing evolution of hydrogen at said first electrode for at least a portion of the time; and gradually exposing the electrically conductive thin coating on the ceramic body edgewise to the action of said electrolytically-conductive solution in a manner to gradually decrease the area thereof while maintaining the point of connection of said source of electrical energy thereto within the decreasing area.

References Cited in the file of this patent

UNITED STATES PATENTS

| | | |
|---|---|---|
| 1,416,929 | Bailey | May 23, 1922 |
| 2,046,467 | Krause | July 7, 1936 |
| 2,441,960 | Eisler | May 25, 1948 |
| 2,443,119 | Rubin | June 8, 1948 |
| 2,480,845 | Frager et al. | Sept. 6, 1949 |